(12) United States Patent
Lesage et al.

(10) Patent No.: US 8,871,852 B2
(45) Date of Patent: Oct. 28, 2014

(54) SELF-SEALING ELASTOMER COMPOSITION

(75) Inventors: Pierre Lesage, Clermont-Ferrand (FR); Vincent Abad, Chamalieres (FR)

(73) Assignees: Michelin Recherche et Techniques S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 625 days.

(21) Appl. No.: 13/001,083

(22) PCT Filed: Jun. 3, 2009

(86) PCT No.: PCT/EP2009/003949
§ 371 (c)(1), (2), (4) Date: Mar. 23, 2011

(87) PCT Pub. No.: WO2009/156050
PCT Pub. Date: Dec. 30, 2009

(65) Prior Publication Data
US 2011/0165408 A1    Jul. 7, 2011

(30) Foreign Application Priority Data

Jun. 24, 2008    (FR) ...................................... 08 54154

(51) Int. Cl.
| | |
|---|---|
| *C08K 5/01* | (2006.01) |
| *C08L 53/02* | (2006.01) |
| *B60C 19/12* | (2006.01) |
| *B60C 1/00* | (2006.01) |
| *C08L 9/06* | (2006.01) |
| *B29C 73/20* | (2006.01) |
| *B32B 25/14* | (2006.01) |
| *B29C 73/16* | (2006.01) |
| *B29L 30/00* | (2006.01) |

(52) U.S. Cl.
CPC ............... *B29C 73/163* (2013.01); *C08L 53/02* (2013.01); *B29L 2030/00* (2013.01); *B60C 19/12* (2013.01); *B60C 1/0008* (2013.04); *C08L 9/06* (2013.01); *B29C 73/20* (2013.01); *C08K 5/01* (2013.01); *B32B 25/14* (2013.01); *C08L 53/025* (2013.01)
USPC ........... 524/474; 152/502; 428/515; 524/481; 524/484

(58) Field of Classification Search
USPC ............ 152/502; 524/474, 481, 484; 428/515
See application file for complete search history.

(56) References Cited

U.S. PATENT DOCUMENTS 4,913,209 A    4/1990   Hong et al.

FOREIGN PATENT DOCUMENTS

| EP | 1 090 069 | 7/2004 |
|---|---|---|
| EP | 1 714 802 | 10/2006 |
| WO | WO 99/62998 | 12/1999 |

*Primary Examiner* — Edward Cain
(74) *Attorney, Agent, or Firm* — Cozen O'Connor

(57) ABSTRACT

Self-sealing elastomer composition that can in particular be used as puncture-resistant layer in an inflatable article, comprising at least 30 phr of a saturated thermoplastic styrene elastomer, at most 70 phr of an unsaturated thermoplastic styrene elastomer and more than 200 phr of an oil extender. Inflatable article, such as a tire, provided with a puncture-resistant layer comprising, as self-sealing composition, an elastomer composition according to the invention. Advantageously, the puncture-resistant layer is combined with an airtight layer, for example based on butyl rubber, so as to constitute, in the inflatable article, a puncture-resistant airtight laminate.

20 Claims, 1 Drawing Sheet

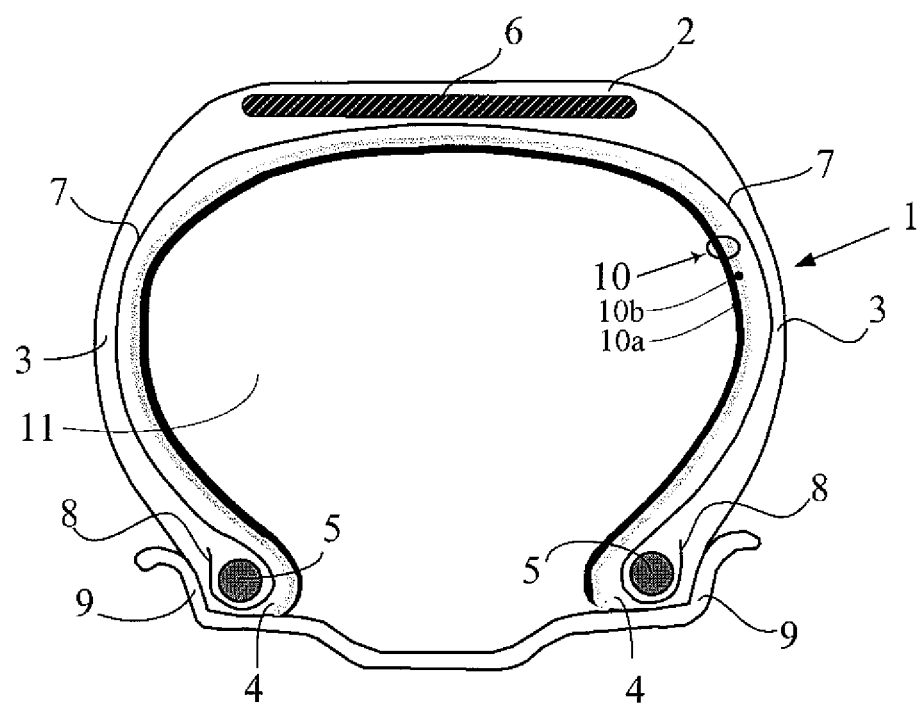

SELF-SEALING ELASTOMER COMPOSITION

RELATED APPLICATION

This is a U.S. National Phase Application under 35 USC 371 of International Application PCT/EP2009/003949, filed on Jun. 3, 2009.

This application claims the priority of French patent application Ser. No. 08/54154 filed Jun. 24, 2008, the entire content of which is hereby incorporated by reference.

FIELD OF THE INVENTION

The present invention relates to self-sealing compositions and to their use as puncture-resistant layers in any type of "inflatable" article, that is to say, by definition, any article that takes its useable shape when inflated with air.

The invention relates more particularly to the use of such compositions in inflatable articles, especially inflatable tires, for sealing off any holes due to perforations in service.

BACKGROUND OF THE INVENTION

Particularly in recent years, tire manufacturers have been making considerable efforts to develop novel solutions to a problem dating from the very first use of tired wheels of the inflatable type, namely the problem of how to allow the vehicle to continue to travel despite a considerable or complete loss of pressure of one or more tires. For decades, the spare tire was considered to be the only and universal solution. Then, more recently, the substantial advantages associated with its possible omission have become apparent. The concept of "extended mobility" was developed. The associated techniques allow the same tire to run, depending on certain limits to be respected, after a puncture or a drop in pressure. This makes it possible for example to drive to a breakdown point without having to stop, often in hazardous circumstances, to fit the spare tire.

Self-sealing compositions that allow such an objective to be achieved, and which by definition are capable of automatically ensuring, that is to say without external intervention, that a tire is sealed in the event of a perforation of the latter by a foreign body, such as a nail; are particularly difficult to develop.

SUMMARY OF THE INVENTION

To be useable, a self-sealing layer must satisfy many conditions of a physical and chemical nature. In particular, it must be effective over a very wide range of operating temperatures, and be so throughout the lifetime of the tires. It must be capable of closing off the hole when the perforating object remains in place and, when the latter is expelled, said self-sealing layer must be able to fill the hole and seal the tire.

Many solutions have been devised but have not been able to be developed for vehicle tires, in particular through the lack of stability over time or lack of effectiveness under extreme operating temperature conditions.

To help to maintain good effectiveness at high temperature, document U.S. Pat. No. 4,113,799 (or FR-A-2 318 042) has proposed, as self-sealing layer, a composition comprising a combination of butyl rubbers of high and low molecular weights, which are partially crosslinked, optionally together with a small amount of a thermoplastic styrene elastomer. To seal well, said composition contains 55 to 70% by weight of a tackifier.

Document U.S. Pat. No. 4,228,839 has proposed, as self-sealing layer for a tire, a rubber compound containing an irradiation-degradable first polymer material, such as polyisobutylene, and an irradiation-crosslinkable second polymer material, preferably a butyl rubber.

Document U.S. Pat. No. 4,426,468 also has proposed a self-sealing composition for tires, based on a crosslinked butyl rubber of very high molecular weight.

A known drawback of butyl rubbers is that they suffer from large hysteresis losses (high tan $\delta$ level) over a wide temperature range, which drawback has repercussions for the self-sealing compositions themselves, with a large increase in hysteresis and an appreciable reduction in rolling resistance of the tires.

The Applicants have moreover found that these compositions based on butyl rubber may also be insufficiently effective after the later expulsion or removal of a perforating object that has remained in place for a long period in the structure of the tire.

Document EP-B1-1 090 069 has admittedly proposed self-sealing compositions containing no butyl rubber, the specific formulation of which comprises, per 100 parts by weight of a styrene based thermoplastic elastomer, 80 to 140 parts of a liquid plasticizer, 110 to 190 parts of a tackifying resin and 2 to 20 parts of an additive.

A large amount of tackifying resin, apart from the higher manufacturing cost of the tires that it incurs, may itself also adversely affect the rolling resistance of the tires because of the risk of the self-sealing composition stiffening excessively.

Now, by continuing their research, the Applicants have discovered a self-sealing composition of appreciably simplified formulation, which requires neither butyl rubber nor the use of tackifying resins, and gives an inflatable article a puncture-resistance performance that is improved in comparison with that of the self-sealing compositions of the prior art.

Compared with the usual self-sealing compositions, it appreciably improves the speed of sealing off a hole when a perforating object is removed, especially later on.

Thus, according to a first aspect, the present invention relates to a self-sealing composition that can be used in particular as a puncture-resistant layer in an inflatable article, comprising at least the following (in which phr denotes parts by weight per hundred parts of rubber):

at least 30 phr of a saturated thermoplastic styrene ("TPS") elastomer;
at most 70 phi of an unsaturated TPS elastomer; and
more than 200 phr of an oil extender for said elastomers.

Another aspect of invention relates to a puncture-resistant airtight laminate that can be used in particular in an inflatable article, comprising at least a puncture-resistant first layer comprising the self-sealing composition of the invention and an airtight second layer.

Such a self-sealing composition or such a laminate can be used in an inflatable article, such as a tire, particularly when said composition or said laminate is placed on the internal wall of said inflatable article or tire.

The above self-sealing composition or laminate can particularly be used in tires intended to be fitted onto vehicles of the passenger type, SUVs (Sport Utility Vehicles), two-wheel vehicles (especially bicycles and motorcycles), aircraft, or industrial vehicles chosen from vans, "heavy" vehicles, i.e. underground trains, buses, road transport vehicles (lorries, tractors, trailers), off-road vehicles, such as agricultural or civil engineering machines, and other transport or handling vehicles.

The invention also relates per se to any inflatable article, in particular a tire, comprising a puncture-resistant layer or a laminate as described above.

BRIEF DESCRIPTION OF THE SINGLE DRAWING

The invention and its advantages will be readily understood in the light of the description and of the exemplary embodiments that follow, together with the single FIGURE relating to these embodiments that shows schematically, in radial cross section, a tire with a radial carcass reinforcement using a self-sealing composition in accordance with an embodiment of the present invention.

DETAILED DESCRIPTION OF THE SINGLE DRAWING

In the present description, unless expressly indicated otherwise, all the percentages (%) indicated are % by weight.

Moreover, any range of values denoted by the expression "between a and b" represents the range of values starting from more than a to less than b (i.e. with the limits a and b excluded), whereas any range of values denoted by the expression "from a to b" means the range of values starting from a and going up to b (i.e. including the strict limits a and b).

I-1. Self-Sealing Composition

The self-sealing composition or material used in accordance with the invention is an elastomer composition comprising at least one saturated TPS elastomer in an amount of at least 30 phr (i.e. 30 phr or more), an unsaturated TPS elastomer in an amount of at most 70 phr (i.e. 70 phr or less) and more than 200 phr of oil as oil extender for said TPS elastomers (in which phr denotes parts by weight per hundred parts of rubber).

I-1-A. Thermoplastic Styrene Elastomers (Saturated and Unsaturated)

The thermoplastic styrene (TPS) elastomers are thermoplastic elastomers in the form of styrene based block copolymers.

These thermoplastic elastomers, having an intermediate structure between thermoplastic polymers and elastomers, are made up, as is known, from polystyrene hard blocks linked by elastomer soft blocks, for example polybutadiene, polyisoprene or poly(ethylene/butylene) blocks. They are often triblock elastomers with two hard segments linked by a soft segment. The hard and soft segments may be arranged in a linear fashion, or in a star or branched configuration. These TPS elastomers may also be diblock elastomers with a single hard segment linked to a soft segment. Typically, each of these segments or blocks contains a minimum of more than 5, generally more than 10, base units (for example styrene units and isoprene units in the case of a styrene/isoprene/styrene block copolymer).

The first essential feature of the composition of the invention is to comprise:
at least 30 phr (i.e. from 30 phr to less than 100 phr), preferably at least 50 phr (i.e. from 50 phr to less than 100 phr), of a saturated TPS elastomer, the latter being combined with:
at most 70 phr (i.e. from more than 0 phr to 70 phr), preferably at most 50 phr (i.e. from more than 0 phr to 50 phr) of an unsaturated TPS elastomer.

In other words, the saturated TPS elastomer content is in the range from 30 phr as a minimum to less than 100 phr, and the unsaturated TPS elastomer content (always present in the composition) is in the range from more than 0 phr to 70 phr as a maximum).

In the present application, the following definitions are understood, as is well known:
saturated TPS elastomer is understood to mean a TPS elastomer with no ethylenic unsaturation (i.e. no carbon-carbon double bond); and
unsaturated TPS elastomer is understood to mean a TPS elastomer that contains ethylenically unsaturated groups, i.e. it contains carbon-carbon double bonds (whether conjugated or not).

Preferably, the saturated TPS elastomer is chosen from the group formed by styrene/ethylene/butylene (SEB), styrene/ethylene/propylene (SEP), styrene/ethylene-ethylene/propylene (SEEP), styrene/ethylene-butylene/styrene (SEBS), styrene/ethylene-propylene/styrene (SEPS), styrene/ethylene-ethylene-propylene/styrene (SEEPS) block copolymers and blends of these copolymers.

More preferably, said elastomer is chosen from the group formed by SEBS copolymers, SEPS copolymers and blends of these copolymers.

Preferably, the unsaturated TPS elastomer is chosen from the group formed by styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS), styrene/butadiene/isoprene/styrene (SBIS) block copolymers and blends of these copolymers. More preferably, this unsaturated TPS elastomer is a copolymer of the triblock type, chosen from the group formed by styrene/butadiene/styrene (SBS), styrene/butadiene/butylene/styrene (SBBS), styrene/isoprene/styrene (SIS), styrene/butadiene/isoprene/styrene (SBIS) block copolymers and blends of these copolymers.

It should be emphasized that the presence of the unsaturated TPS elastomer in the self-sealing composition, with the contents recommended above, makes it easier for said composition to adhere more easily to an at least partly unsaturated polymer matrix, for example to a layer of diene elastomer such as butyl rubber.

For optimum performance in terms of self-sealing properties and adhesive properties, it is preferred for the saturated TPS elastomer content to be at least equal to 60 phr, more preferably in the range from 70 to 95 phr, and for the unsaturated TPS elastomer content to be at most equal to 40 phr, preferably in the range from 5 to 30 phr.

According to another preferred embodiment of the invention, the styrene content, in each saturated and unsaturated TPS elastomer, is between 5 and 50%. Below the indicated minimum, the thermoplastic character of the elastomer runs the risk of being substantially reduced, whereas above the recommended maximum, the elasticity of the composition may be affected. For these reasons, the styrene content is more particularly between 10 and 40%, in particular between 15 and 35%.

It is preferable for the $T_g$ (measured by DSC (Differential Scanning Calorimetry) according to ASTM D3418, 1999) of the saturated TPS elastomer to be below −20° C., more preferably below −40° C. A $T_g$ value above these minima, implying a higher $T_g$ of the composition itself, may reduce the performance of the self-sealing composition when it is used at very low temperature; for such a use, the $T_g$ of the saturated TPS elastomer is more preferably still below −50° C.

The number-average molecular weight (denoted by $M_n$) of each TPS elastomer, saturated and unsaturated is preferably between 50 000 and 500 000 g/mol, more preferably between 75 000 and 450 000 g/mol. Below the minima indicated, the cohesion between the TPS elastomer chains, because of its dilution (amount of extender), runs the risk of being degraded; moreover, an increase in the usage temperature runs the risk of adversely affecting the mechanical properties, especially the properties at break, consequently leading to reduced "hot" performance. Moreover, too high a molecular weight $M_n$ may be detrimental as regards the flexibility of the composition at the recommended extender oil contents. Thus, it has been found that a value lying within the 250 000 to 400 000 range was particularly suitable, especially for use of the self-sealing composition in an inflatable tire.

The number-average molecular weight ($M_n$) of the TPS elastomer is determined, in a known manner, by SEC (steric exclusion chromatography). The specimen is firstly dissolved in tetrahydrofuran with a concentration of about 1 g/l and then the solution is filtered on a filter of 0.45 µm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series, with the "STYRAGEL" trade names ("HMW7", "HMW6E" and two "HT6E"s, is used. The injected volume of the polymer specimen solution is 100 µl. The detector is a WATERS 2410 differential refractometer and its associated software for handling the chromatograph data is the WATERS MILLENIUM system. The calculated average molecular weights are relative to a calibration curve obtained with polystyrene standards.

The two TPS elastomers described above may constitute all of the elastomer matrix or the predominant portion by weight (i.e., more than 50%, preferably more than 70%) of the latter, when said matrix comprises one or more other elastomers, whether thermoplastic or not, for example elastomers of the diene type.

According to a preferred embodiment, these two TPS elastomers are the sole elastomers, and the sole thermoplastic elastomers present in the self-sealing composition.

Saturated TPS elastomers, such as for example SEPS or SEBS, extended in particular with large amounts of oil, are well known and commercially available. As examples of commercial saturated TPS in extended form, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), both of these being sold by Multibase under the name "Multiflex" (e.g. "Multiflex G00"). These products, developed in particular for medical, pharmaceutical or cosmetic applications, may be processed in the conventional manner for TPEs, by extrusion or moulding, starting from a raw material available in the form of beads or granules. Of course, the saturated TPS elastomers are also available in non-extended form. Examples of these that may be mentioned are the elastomers of the SEBS or SEPS type, sold by the company Kraton under the name "Kraton G" (e.g. the products G1650, G1651, G1654, G1730) or by the company Kuraray under the name "Septon" (e.g. S2005, 52006, 58004, S8006).

Unsaturated TPS elastomers, such as for example SBS, SIS or SBBS, are also well known and commercially available, for example from the company Kraton under the name "Kraton D" (e.g. the products D1161, D1118, D1116, D1163 in the case of SIS and SBS elastomers), from the company Dynasol under the name "Calprene" (e.g. the products C405, C411, C412 in the case of SBS elastomers) or else from the company Asahi under the name "Tuftec" (e.g. the product P1500 in the case of an SBBS elastomer).

The two TPS elastomers described above, used in combination, have proved to be capable, after an oil extender has been added in the recommended amount, to fulfil the function of an effective self-sealing composition, as will be explained in detail in the rest of the description.

I-1-B. Oil Extender

The second essential constituent of the self-sealing composition is an oil extender (or plasticizing oil) used with a very high content, greater than 200 phr—more than 200 parts by weight per hundred parts of total elastomer (i.e., saturated and unsaturated TPS elastomers plus, as the case may be, additional elastomer(s))—preferably greater than 250 phr.

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins, which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

More preferably, the oil extender is chosen from the group formed by polybutenes, paraffinic oils and mixtures of these oils. Most particularly, a polyisobutene oil, in particular a polyisobutylene ("PIB") oil is used.

As examples, polyisobutylene oils are sold in particular by Univar under the name "Dynapak Poly" (e.g. "Dynapak Poly 190"), by BASF under the name "Glissopal" (e.g. "Glissopal 1000") or "Oppanol" (e.g. "Oppanol B12"); paraffinic oils are sold for example by Exxon under the name "Telura 618" or by Repsol under the name "Extensol 51".

The number-average molecular weight ($M_n$) of the extender oil is preferably between 200 and 30 000 g/mol, more preferably still between 300 and 10 000 g/mol. For excessively low $M_n$ values, there is a risk of the oil migrating to the outside of the self-sealing composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in an inflatable tire.

The number-average molecular weight ($M_n$) of the extender oil is determined by SEC, the specimen being firstly dissolved in tetrahydrofuran with a concentration of about 1 g/l and then the solution is filtered on a filter of 0.45 µm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the name "STYRAGEL HT6E" is used. The injected volume of the polymer specimen solution is 100 µl. The detector is a WATERS 2410 differential refractometer and its associated software for handling the chromatographic data is the WATERS MILLENIUM system. The calculated average molecular weights are relative to a calibration curve obtained with polystyrene standards.

A person skilled in the art will know, in the light of the description and the embodiments that follow, how to adjust the quantity of extender oil according to the particular usage conditions of the self-sealing composition, in particular according to the inflatable article in which it is intended to be used.

It is preferable for the extender oil content to be between 200 and 900 phr, more preferably between 250 and 850 phe. Below the indicated minimum, the self-sealing composition runs the risk of having too high a rigidity for certain applications, whereas above the recommended maximum there is a risk of the composition having insufficient cohesion. For this reason, the oil extender content is preferably between 300 and 800 phr, especially for use of the self-sealing composition in an inflatable tire.

I-1-C. Various Additives

Various other additives may be added, typically in a small amount (preferably with contents below 20 phr, more preferably below 10 phr), for example reinforcing fillers, such as carbon black, non-reinforcing or inert fillers, lamellar fillers, protective agents, such as UV stabilizers, antioxidants or antioxidants, various other stabilizers, and colorants advantageously useable for colouring the self-sealing composition.

Although the self-sealing composition, thanks to its specific formulation, does not require the use of a plasticizing or tackifying hydrocarbon resin, the invention also applies to cases in which such a resin is used. As is known to those skilled in the art, the term "resin" is reserved, by definition, to a compound which, on the one hand, is solid at room temperature (23° C.) (as opposed to a liquid plasticizing compound such as an oil) and, on the other hand, compatible (i.e. miscible at the content used) with the elastomer composition for which it is intended, so as to act as a true diluent.

Examples of such hydrocarbon resins that may be mentioned include those chosen from the group formed by homopolymer or copolymer cyclopentadiene (CPD) or dicyclopentadiene (DCPD) resins, terpene homopolymer or copolymer resins, C5 cut homopolymer or copolymer resins and blends of these resins.

Apart from the elastomers described above (saturated TPS, unsaturated TPS and other possible elastomers), the self-sealing composition could also contain, again in a minor fraction by weight compared with the TPS elastomers, polymers other than elastomers, such as for example thermoplastic polymers compatible with the TPS elastomers.

I-2. Use of the Self-Sealing Composition as a Puncture-Resistant Layer

The self-sealing composition or material described above is an elastic compound solid (at 23° C.) which is characterized in particular, thanks to its specific formulation, by a very high flexibility and deformability.

It may be used as a puncture-resistant layer in any type of "inflatable" article, that is to say, by definition, any article that takes its useable form when inflated with air.

Examples of such inflatable articles that may be mentioned include inflatable boats and balloons or balls used for games or sport.

It is particularly well suited to use as a puncture-resistant layer in an inflatable article, finished or semifinished product, made of rubber, most particularly in a tire for a motor vehicle, such as a vehicle of the two-wheeled type, a passenger or industrial vehicle, or a non-automobile vehicle such as a bicycle.

Such a puncture-resistant layer is preferably placed on the internal wall of the inflatable article, completely or at least partly covering it, but it may also be completely integrated into its internal structure.

The thickness of the puncture-resistant layer is preferably greater than 0.3 mm, more preferably between 0.5 mm and 10 mm (in particular between 1 and 5 mm).

It will be readily understood that, in the specific fields of application, the dimensions and the pressures involved and the method of implementing the invention may vary, the puncture-resistant layer then comprising several preferred thickness ranges. Thus, for example, for tires of the passenger vehicle type, said puncture-resistant layer may have a thickness of at least 0.5 mm, preferably between 1 and 5 mm. According to another example, for heavy or agricultural vehicle tires, the preferred thickness may be between 1 and 6 mm. According to another example, for vehicle tires in the civil engineering or aircraft field, the preferred thickness may be between 2 and 10 mm. Finally, according to another example, for bicycle tires, the preferred thickness may be between 0.4 and 2 mm.

The self-sealing composition described here has the advantage of suffering practically no adverse effect in terms of rolling resistance, over a very wide operating temperature range of the tires, compared with a tire not having such a self-sealing layer. Compared with the usual self-sealing compositions, it very appreciably improves the rate at which the hole is plugged, in particular when a perforating object is subsequently removed.

Furthermore, the usual self-sealing compositions undergo considerable creep. While the tires are running, said self-sealing compositions are often expelled from the sidewall part of these tires under the effect of the centrifugal forces and build up in their crown portion. This is not the case for the compositions recommended by the present invention, which may be placed in any internal portion of the tires.

Of course, the invention applies to cases in which the self-sealing composition described above is used in a tire or any other inflatable article without necessarily being combined with an airtight layer.

However, according to a particular preferred embodiment of the invention, the self-sealing composition is combined with at least a second, airtight layer in order to form a multi-layer laminate, which is self-sealing and airtight, and which can be used in particular as an internal wall of an inflatable article such as a tire.

The second layer of the laminate may comprise any type of material that can fulfil the function of an airtight film (or more generally a gas-tight film), whether this is for example a metallic material or a polymeric material. Preferably, this airtight layer has a thickness of greater than 0.05 mm, more preferably between 0.05 and 6 mm (for example from 0.1 to 2 mm).

According to a preferred embodiment, this airtight second layer comprises a butyl rubber composition. The term "butyl rubber" should be understood, as is known, to mean an isobutylene/isoprene copolymer (abbreviated to IIR), and also halogenated, preferably chlorinated or brominated, versions of this type of copolymer. Preferably, the butyl rubber is a halogenated butyl rubber or a blend of halogenated and non-halogenated butyls. The butyl rubber may be used by itself or in combination with one or more other elastomers, especially diene elastomers, such as for example natural rubber or a synthetic polyisoprene. The airtight composition also includes the various additives that are usually present in the airtight layers known to those skilled in the art, such as reinforcing fillers, such as carbon black, lamellar fillers improving the sealing (e.g. phyllosilicates such as kaolin, talc, mica, clays or modified clays ("organo clays")), protective agents such as antioxidants or antiozonants, a crosslinking system (for example based on sulphur or peroxides) and various processing aids or other stabilizers.

The two layers of the above laminate may be joined together by any appropriate means, for example by a simple curing operation, preferably under pressure (for example around ten minutes at 150° C. under a pressure of 16 bar).

EXEMPLARY EMBODIMENT OF THE INVENTION

The self-sealing composition and the multilayer laminate described above may advantageously be used in tires for all types of vehicle, particularly in tires for passenger vehicles liable to run at very high speed or tires for heavy industrial vehicles liable to run and operate under particularly high internal temperature conditions.

To give an example, the single appended FIGURE shows very schematically (without complying to a specific scale), a radial cross section through a tire according to the invention.

This tire 1 comprises a crown 2 reinforced by a crown reinforcement or belt 6, two sidewalls 3 and two beads 4, each of these beads 4 being reinforced with a bead wire 5. The crown 2 is surmounted by a tread (not shown in this schematic FIGURE). A carcass reinforcement 7 is wound around the two bead wires 5 in each bead 4, the upturn 8 of this reinforcement 7 lying for example towards the outside of the tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to make an angle of between 80° and 90° with the circumferential mid-plane (the plane perpendicular to the rotation axis of the tire, which lies at mid-distance between the two beads 4 and passes through the middle of the crown reinforcement 6).

The tire 1 is characterized in that its internal wall includes a multilayer laminate (10) comprising at least two layers (10a, 10b), which is self-sealing thanks to its first layer (10a) and airtight thanks to its second layer (10b).

According to a preferred embodiment of the invention, the two layers (10a, 10b) cover substantially the entire internal wall of the tire, extending from one sidewall to the other, at least up to level with the rim gutter when the tire is in the fitted position. According to other possible embodiments, the layer 10a could however cover only a portion of the airtight zone (layer 10b), for example only the crown zone of the tire, or it could extend at least from the crown zone to the shoulders or to the mid-point (the equator) of said tire.

According to another preferred embodiment, the laminate is placed in such a way that the self-sealing first layer (10a) is radially the outermost layer in the tire relative to the other layer (10b), shown schematically in the appended FIGURE. In other words, the self-sealing layer (10a) covers the airtight layer (10b) on the side facing the internal cavity 11 of the tire 1. Another possible embodiment is that in which this layer (10a) is the radially most internal layer, therefore placed between the sealed layer (10b) and the rest of the structure of the tire 1.

In this example, the layer 10b (with a thickness of 0.7 to 0.8 mm) is based on butyl rubber and has a conventional formulation for an "inner liner" which usually defines, in a conventional tire, the radially internal face of said tire, intended to protect the carcass reinforcement from air diffusing from the internal space of the tire. This airtight layer 10b therefore enables the tire 1 to be inflated and to hold pressure. Its sealing properties enable it to guarantee a relatively low rate of pressure loss, enabling the tire to be kept inflated, in a normal operating state, for a sufficient duration, normally for several weeks or several months.

The layer 10a itself consists of a self-sealing composition comprising the three essential constituents, namely an SEBS saturated elastomer ("G1654" from the company Kraton; with a styrene content of about 30%, a $T_g$ close to −60° C. and an $M_n$ of around 150 000 g/mol) with a weight content of 75 phr, an SBS unsaturated TPS elastomer ("D1118" from the company Kraton) with a weight content of 25 phr and finally a polyisobutylene oil extender ("Dynapak 190" from the company Univar—with an $M_n$ of 1000 g/mol) with a weight content of about 400 phr.

The above self-sealing composition is prepared as follows. The three constituents (SEBS, SBS and oil) were compounded conventionally, using a twin-screw (40 L/D) extruder at a temperature typically above the melting point of the composition (about 190° C.). The extruder used had two different feeds (hoppers) (one for SEBS and the other for SBS) and a pressurized liquid injection pump for the polyisobutylene oil extender. The extruder was also provided with a die for extruding the product with the required dimensions.

The layer 10a, placed therefore between the layer 10b and the cavity 11 of the tire, gives the tire effective protection against loss of pressure due to accidental perforations, enabling these perforations to be automatically sealed off.

If a foreign body, such as a nail, passes through the structure of the tire, for example a wall, such as a sidewall 3 or the crown 6 of the tire 1, the composition serving as self-sealing layer is subjected to several stresses. In reaction to these stresses, and thanks to its advantageous deformability and elasticity properties, said composition creates an impermeable contact zone around the body. It does not matter whether the contour or the profile of said body is uniform or regular, the flexibility of the self-sealing composition enabling it to be insinuated into openings of very small size. This interaction between the self-sealing composition and the foreign body seals the zone affected by said body.

In the event of the foreign body being removed, whether accidentally or intentionally, a perforation remains, this being liable to create a relatively large leak, depending on its size. The self-sealing composition, exposed to the hydrostatic pressure, is sufficiently soft and deformable to seal off, by being deformed, the perforation, preventing the inflation gas from leaking. In particular in the case of a tire, it has been shown that the flexibility of the self-sealing composition enables the forces of the surrounding walls to be withstood without any problem, even during phases in which the loaded tire deforms when running.

The tire provided with its puncture-resistant layer (10a) as described above may advantageously be produced before vulcanization (or curing). The self-sealing composition is simply applied in a conventional manner at the desired place, so as to fowl the layer 10a. The vulcanization operation is then carried out conventionally. TPS elastomers are well able to withstand the stresses involved in the vulcanization step.

An advantageous manufacturing variant, for a person skilled in the art of manufacturing tires, would for example consist, during a first step, in depositing the self-sealing composition flat, directly on a tire-building drum, in the form of a skim of suitable thickness (for example 2 to 6 mm), before being covered with the airtight layer, followed by the rest of the structure of the tire, using manufacturing techniques well known to those skilled in the art.

The invention claimed is:

1. A self-sealing thermoplastic elastomer composition that can be used in particular as a puncture-resistant layer in an inflatable article, comprising at least the following (in which phr denotes parts by weight per hundred parts of rubber):
   at least 30 phr of a saturated thermoplastic styrene elastomer;
   from more than 0 phr to 70 phi of an unsaturated TPS elastomer; and
   more than 200 phr of an oil extender for said elastomers.

2. The composition according to claim 1, wherein the amount of saturated TPS elastomer is at least 50 phr and the amount of unsaturated TPS elastomer is at most 50 phr.

3. The composition according to claim 1, wherein the saturated TPS elastomer is chosen from the group formed by styrene/ethylene/butylene (SEB), styrene/ethylene/propylene (SEP), styrene/ethylene-ethylene/propylene (SEEP), styrene/ethylene-butylene/styrene (SEBS), styrene/ethylene-propylene/styrene (S EPS), styrene/ethylene-ethylene-propylene/styrene (SEEPS) copolymers and blends of these copolymers.

4. The composition according to claim 3, wherein the saturated TPS elastomer is chosen from the group formed by SEBS copolymers, SETS copolymers and blends of these copolymers.

5. The composition according to claim 1, wherein the unsaturated TPS elastomer is chosen from the group formed by styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS), styrene/butadiene/isoprene/styrene (SBS) block copolymers and blends of these copolymers.

6. The composition according to claim 1, wherein each saturated and unsaturated TPS elastomer comprises between 5 and 50% styrene by weight.

7. The composition according to claim 1, wherein the number-average molecular weight of each saturated and unsaturated TPS elastomer is between 50 000 and 500 000 g/mol.

8. The composition according to claim 1, wherein the extender oil is chosen from the group formed by polyolefinic oils, paraffinic oils, naphthenic oils, aromatic oils, mineral oils and mixtures of these oils.

9. The composition according to claim 8, wherein the oil extender is chosen from the group formed by polybutene oils, paraffinic oils and mixtures of these oils.

10. The composition according to claim 9, wherein the oil extender is a polyisobutylene oil.

11. The composition according to claim 1, wherein the number-average molecular weight of the oil extender is between 200 and 30 000 g/mol.

12. The composition according to claim 1, wherein the amount of extender oil is between 200 and 900 phr.

13. The composition according to claim 1, wherein the amount of saturated TPS elastomer is at least equal to 60 phr, and the amount of unsaturated TPS elastomer is at most equal to 40 phr.

14. A puncture-resistant airtight multilayer laminate that can be used in particular in an inflatable article, comprising:
   a puncture-resistant first layer comprising the self-sealing elastomer composition defined in claim 1; and
   an airtight second layer.

15. The laminate according to claim 14, wherein the airtight layer has a butyl rubber composition.

16. An inflatable article comprising a self-sealing composition or a puncture-resistant airtight laminate according to claim 1.

17. The inflatable article according to claim 16, wherein the self-sealing composition or the puncture-resistant airtight laminate is deposited on the internal wall of the inflatable article.

18. The inflatable article according to claim 16, wherein said article is a rubber article.

19. The inflatable article according to claim 16, wherein said article is an inflatable tire for a vehicle.

20. The composition according to claim 16, wherein the amount of saturated TPS elastomer is in the range from 70 to 95 phr, and the amount of unsaturated TPS elastomer is in the range from 5 to 30 phr.

* * * * *